United States Patent [19]
Costes

[11] 3,913,960
[45] Oct. 21, 1975

[54] CLAMPING SYSTEM FOR THE LID OF A PRESSURIZED ENCLOSURE

[75] Inventor: Didier Costes, Paris, France

[73] Assignee: Commissariat a l'Energie Atomique, Paris, France

[22] Filed: Feb. 5, 1974

[21] Appl. No.: 440,135

[30] Foreign Application Priority Data
Feb. 6, 1973   France .................................. 73.04170

[52] U.S. Cl. ............... 292/256.65; 52/224; 292/45; 292/201
[51] Int. Cl.² ........................................ B65D 45/30
[58] Field of Search ........ 292/45, 201, 256, 256.65, 292/256.69, 338; 220/55 R, 55 T, 55 Y; 176/87; 52/19, 21, 223, 224–230

[56] References Cited
UNITED STATES PATENTS

| | | | |
|---|---|---|---|
| 2,786,704 | 3/1957 | Presdee et al. ..................... | 292/256 |
| 3,353,859 | 11/1967 | Schupack ............................ | 52/224 |
| 3,389,516 | 6/1968 | Ziegler ................................ | 176/87 |
| 3,568,379 | 3/1971 | Johnsson et al. .................... | 52/224 |

Primary Examiner—Philip C. Kannan
Attorney, Agent, or Firm—Cameron, Kerkam, Sutton, Stowell & Stowell

[57] ABSTRACT

The system for clamping two components by separating two oppositely-facing and substantially parallel flat surfaces of said components essentially comprises two toggle arms which are applied in contact with each other by means of a rolling zone provided at one end and are applied respectively against the two flat surfaces by means of rolling zones provided at the opposite end, and a system for exerting lateral thrust on at least one of the toggle arms, each arm being provided with means for producing displacement in rolling motion without sliding.

5 Claims, 4 Drawing Figures

CLAMPING SYSTEM FOR THE LID OF A PRESSURIZED ENCLOSURE

The present invention relates to a system for clamping the lid of a pressurized enclosure.

More precisely, this invention relates to a thrust-application and clamping system as applicable in particular to the covers or lids of large prestressed containment vessels employed in nuclear energy, and more especially to lids for the prestressed concrete pressure vessels of boiling-water reactors.

The system is primarily applicable to the pressure vessel of a boiling-water reactor which is intended to withstand a normal internal pressure of 70 bars and an accidental internal pressure of 175 bars, and in which the seal plug employed for closing the shell has a diameter of 5 to 6 meters. The plug rests on a seating within an orifice of the pressure vessel and means for application of thrust and clamping in compression are disposed at uniform intervals between the plug and the walls of the external extension of the orifice. The sealing joint between the shell and the lid may or may not admit of relative axial displacements; those which do admit of such displacements (metallic omega seal, O-ring seal of the elastomer type) are usually more costly and more delicate. It is in any case an advantage to limit the axial displacement of the plug by applying this latter fairly powerfully against a front abutment since the clamping means are thus prestressed to a certain extent. The other types of seals must always remain compressed between two flat or conical surfaces and require an axial clamping force which exceeds the thrust load, that is to say the application of full prestress. Consideration is given in particular to the so-called "hot-wall" pressure vessels in which the internal metallic lining membrane is subjected to the temperature of the heat-transporting fluid. The seal plug can be provided on its underface with a similar lining. The linings of both the shell and the lid are applied against each other along a 45° cone and can thus form a tight seal; in order to overcome expansion stresses, the axial prestress has to be increased still further.

Apart from the system in which the seal plugs are secured by means of threaded tie-rods and which is in any case considered unsuited to the conditions of safety of prestressed concrete pressure vessels, it is found that few known systems permit prestressing to the high values required and this is one of the objectives of the invention.

Moreover, the known devices must be operated and maintained in the dry and this is attended by a serious disadvantage. In fact, the handling pond located above the reactor is therefore filled with water only when everything is ready for transfer of the radioactive elements. A large reservoir of treated water must accordingly be made available and the water is liable in addition to be contaminated and rendered turbid during pumping operations.

In order to save time and reduce investments, it is an advantage to carry out plug-positioning and removal operations underwater without ever emptying the handling pond. The clamping devices must therefore operate without grease and without direct manual intervention. The present invention accordingly introduces a novel design concept in which clamping operations are carried out by means of member which roll without sliding but are nevertheless guided and driven by hydraulic jacks.

The precise aim of the invention is to provide a clamping system which overcomes the disadvantages mentioned in the foregoing.

The system for clamping two components by separating two substantially parallel flat surfaces which are placed in oppositely facing relation and each of which forms part of one of said components is characterized in that it comprises two compression struts or "toggle arms" provided with a rolling zone at each end, said toggle arms being applied in contact with each other by means of one of their rolling zones and being applied respectively against said two surfaces by means of the second rolling zones, the radii of curvature of said rolling zones in the rolling plane being longer than the half-length of each toggle arm aforesaid, and a system for exerting lateral thrust on at least one of said toggle arms, each toggle arm being provided with means for producing displacement in rolling motion without sliding.

The present invention is also concerned with the practical use of said system for closing the lid of a nuclear reactor vessel with application of prestress.

A better understanding of the invention will in any case be obtained from the following description of one embodiment of the invention which is given by way of non-limitative example, reference being made to the accompanying drawings, in which FIG. 1 is a diagram showing the principle of the clamping system;

Figure 4:
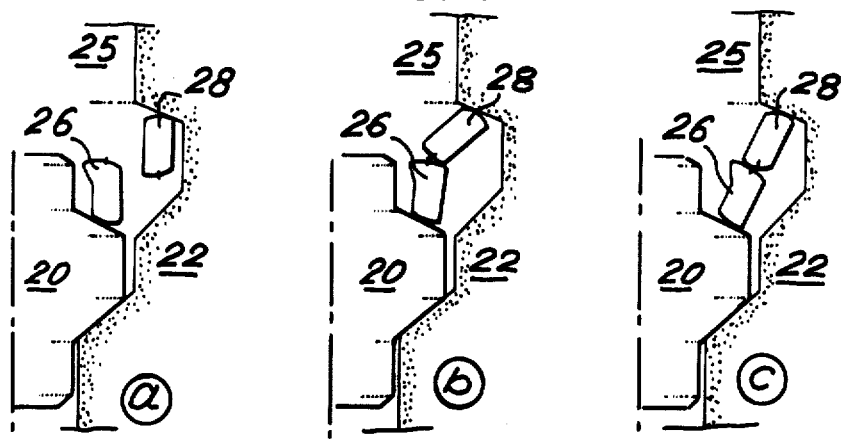

FIG. 4 consists of three simplified views which serve to explain the operation of the clamping system.

Figure 1:
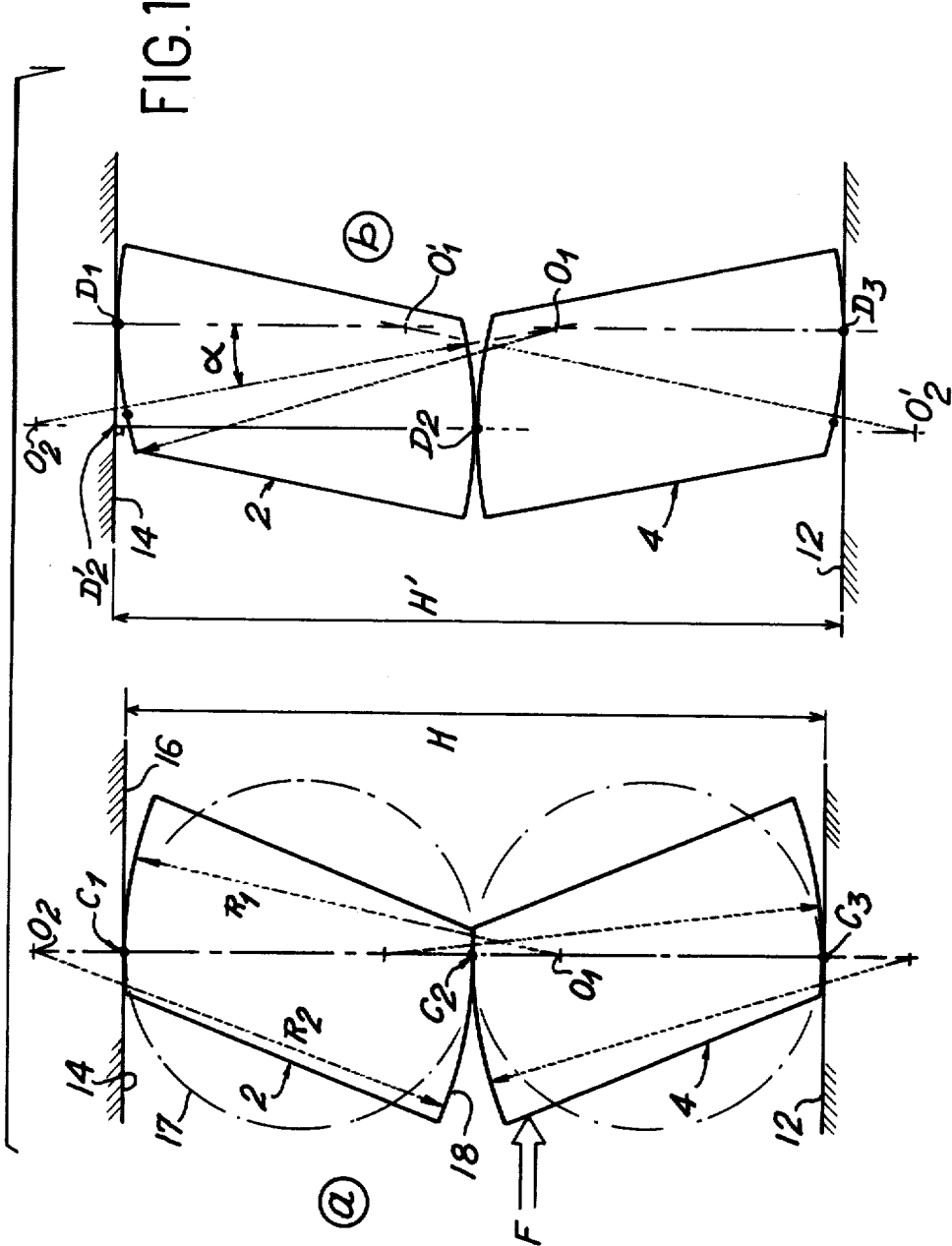

In FIGS. 1a and 1b, there is shown a diagram which illustrates the clamping action produced by the two toggle arms 2 and 4 which are applied respectively against the parallel surfaces 12 and 14. In this embodiment, the two toggle arms 2 and 4 are identical. The top surface 16 of the toggle arm 2 which is in contact with the surface 14 is constituted by a circle having a radius $R_1$ and a center $O_1$. Said radius $R_1$ is longer than one-half of the distance H between the planes 12 and 14 prior to clamping and therefore located outside the circle 17 shown in chain-dotted outline. The bottom surface 18 of the toggle arm 2 is constituted by a circle having a center $O_2$ and a radius $R_2$ which is greater than H/2. In this rest position, the toggle arm 2 is in contact with the surface 14 at the point $C_1$ and with the toggle arm 4 at the point $C_2$; the toggle arm 4 is in contact with the surface 12 at the point $C_3$. These three points are aligned so as to have the minimum distance between the surfaces 12 and 14. Under the action of the force F, steps are taken to have a rolling action without sliding of the toggle arm 2 over the surface 14, of the toggle arm 4 over the surface 12 and of each arm over the other. The arrangement shown in FIG. 1b is accordingly obtained. As will be shown hereinafter, there is obtained a clamping action such that the distance between the planes 12 and 14 increases to the value H' (H' being greater than H). The points of contact in this position are designated by the references $D_1$, $D_2$, $D_3$.

In FIG. 1a, we have:

$$C_1 C_2 = R_1 + R_2 - O_1 O_2$$

In FIG. 1b, we have:

$D'_2 D_2 = R_1 + R_2 - O_1 O_2 (\cos \alpha)$ if $D'_2$ designates the orthogonal projection of $D_2$ on the surface 14 and if $\alpha$ is the angle made with the normal to the surface 14 by the straight line between the centers $O'_1 O'_2$.

It is therefore established that $D'_2 D_2 > C_1 C_2$ and therefore that $H' > H$.

Figure 2:
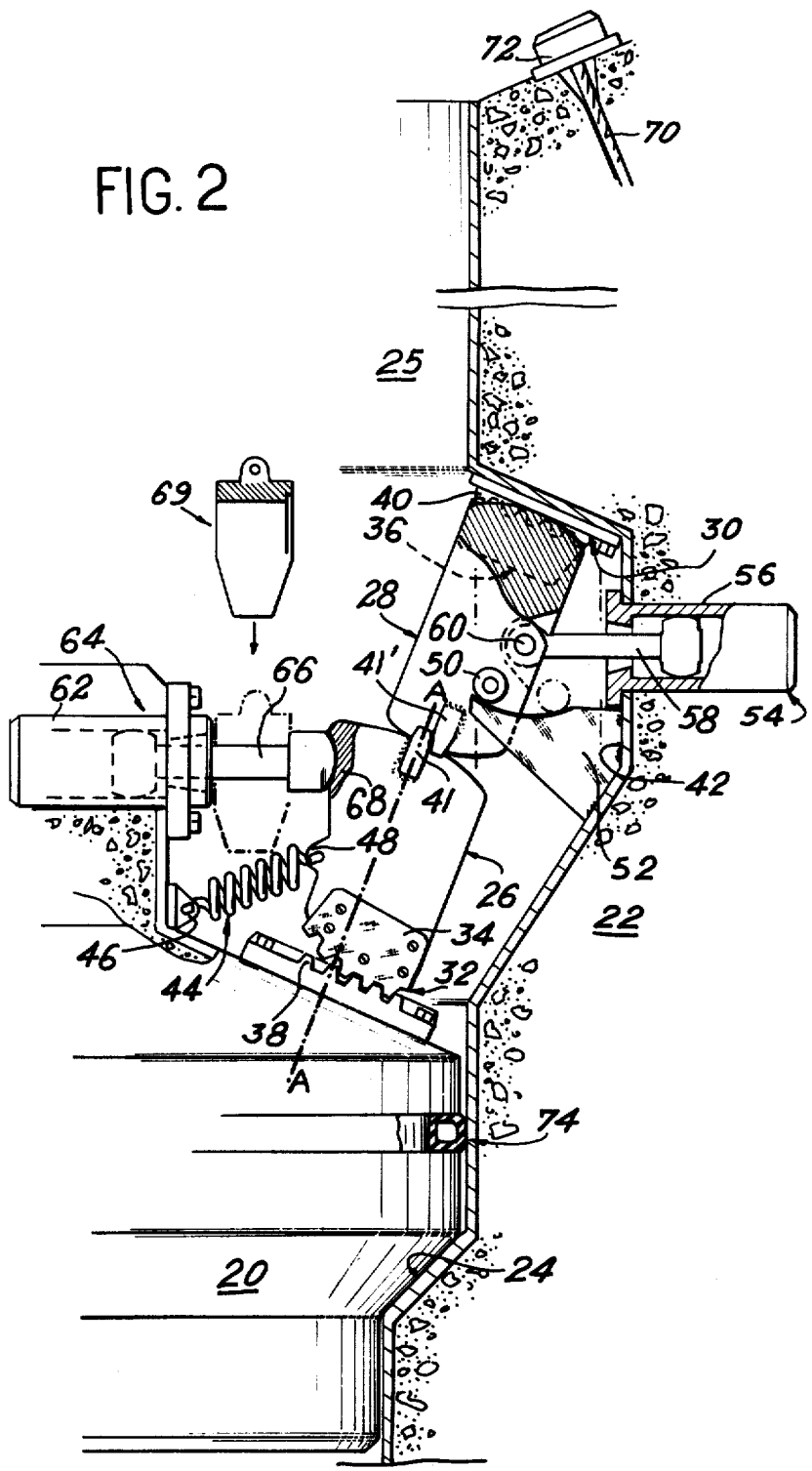
FIG. 2 shows one example of application of the clamping system to the closure of a nuclear reactor pressure vessel.

It is observed in addition that the lateral thrust F does not have a tendency to realign the axes of rotation which pass through the three contact points but on the contrary to displace said axes to a greater extent. It is clearly apparent that FIG. 2 shows only one example of construction and that the two toggle arms need not necessarily be identical. Furthermore, each contact surface can have a variable curvature provided that the smallest radius of curvature of the active portion of said surfaces is longer than one-half the length of the corresponding toggle arm.

In FIG. 2, there is shown one example of execution of the clamping system as applied to the case of a nuclear reactor plug.

Figure 3:
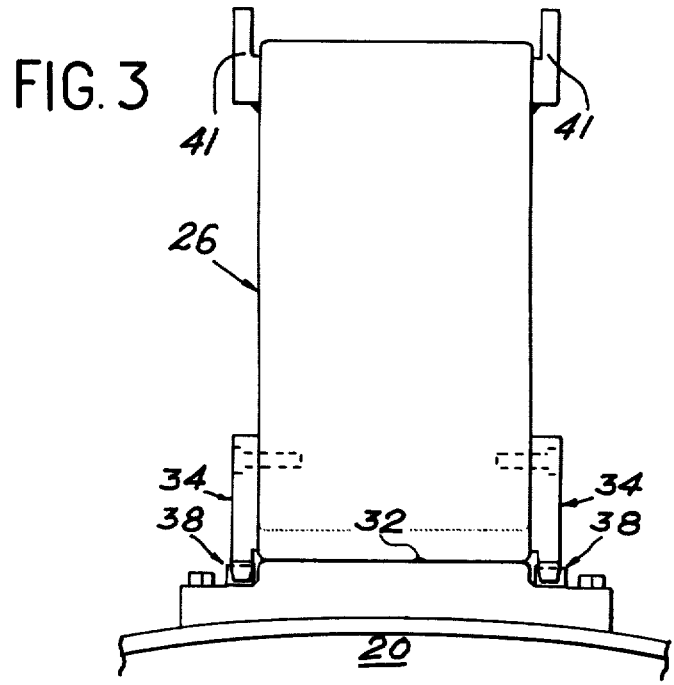
FIG. 3 is a sectional view taken along the plane A—A of FIG. 2 and showing one toggle arm of the clamping system.

The plug 20 closes the top portion of the shell 22 of the reactor vessel and is applied against the conical seating 24 formed in the orifice 25 of said shell. The plug 20 is applied against said seating 24 by means of a plurality of clamping systems of the type described in the foregoing, one example of which is constituted by the toggle arms 26 and 28 as illustrated. Rolling without sliding of the toggle arms 26 and 28 respectively over the bearing surfaces 30 and 32 is obtained by means of toothed sectors 34 and 36 which cooperate with toothed racks 38 and 40. Said toothed racks are rigidly fixed to bearing surfaces 30 and 32 and the surface 30 constitutes a recess 42 in the shell 22. The toothed sectors are constituted by plates mounted separately on each side of each toggle arm as shown in FIG. 3. Furthermore, each toggle arm is provided at the other end with two studs 41 and 41' respectively which are fixed on each flank of said arms. Rolling motion of the toggle arm 26 on the surface 32 without sliding is obtained by means of the toothed sector which has already been described and by means of the spring 44. One end of said spring is fastened to the steel bracket 46 which is rigidly fixed to the plug 20 and the other end of said spring is fastened in the lug 48 which is integral with the toggle arm 26. Rolling motion of the toggle arm 28 without sliding is carried out by means of the toothed sector which has already been described and by means of the roller 50 which is attached to the toggle arm 28 and cooperates with the support bracket 52 which is secured to the shell 22 by any suitable means. The toggle arm 28 can be actuated by means of the jack 54, the body 56 of said jack being rigidly fixed to the shell 22 and the operating stem 58 of the jack being attached to the toggle arm 28 by means of the pivot-pin 60. The toggle arm 26 is set in motion by means of the jack 64, the body 62 of said jack being rigidly fixed to the plug 20 and the operating stem 66 of the jack being applied against the face 68 of the toggle arm 26.

There have also been shown the prestressing tendons 70 and their anchoring nuts 72 as well as the seal 74 between the plug 20 and the shell 22. The operating stem 66 of the jack 64 can be locked in any particular position by means of the removable key 69. Said key can obviously be replaced by a nut or any other suitable means for locking the operating stem 66 in position with respect to the jack body 62.

In order to release the knuckle-joint shown in the figure, the key 69 is removed, the jack 64 is de-energized and this results in a movement of withdrawal of the piston 66; on the contrary, the jack 56 is energized and this causes separation of the toggle arms 26 and 28. Under the action of the spring 44, the toggle arm 26 is applied against the head of the withdrawn operating stem 66; the action of the jack 56 is released and the toggle arm 28 moves back to a position in which it is housed within the recess 42, whereupon the plug 20 can be removed.

In order to lock the knuckle-joint once again, the operation is performed in the reverse direction. The different operations involved are shown in FIG. 4. In the starting position (4a), the toggle arm 28 is located within the interior of the recess 42 and the toggle arm 26 is against the plug 20. The jack 54 is energized so as to move the toggle arm 28 away from the recess 42 and bring it into position opposite to the toggle arm 26 (in position 4b). The jack 64 is then energized and applies the force F to the toggle arm 26 (position 4c). The jack 54 is de-energized and clamping accordingly takes place. At the outset, the toggle arm 28 is displaced by the arm 26 without sliding motion and this is achieved by means of the studs 41 and 41'.

The jack 54 can be replaced by a cable which serves to operate the toggle arm 28 in order to release the knuckle-joint.

Only one knuckle-joint has been shown in the drawings but it is readily apparent that provision is made in practice for a plurality of joints which are spaced at uniform intervals over the periphery of the plug 20. In the case of a plug diameter of 5.6 meters, for example, it will be possible to utilize 32 knuckle-joints in uniformly spaced relation.

One advantage of the system when this latter is applied to boiling-water reactors lies in the fact that positioning and removal of the pressure-vessel plug can be performed without emptying the handling pond at any time, thereby achieving both a saving of time and a reduction in capital investment. In point of fact, when employing the clamping system in accordance with the invention, the components are not greased or lubricated and no direct manual intervention is necessary.

What is claimed is:

1. A system for clamping two components by separating two substantially parallel flat surfaces which are placed in oppositely facing relation and each of which forms part of one of said components, wherein said system comprises two compression struts or "toggle arms" provided with a rolling zone at each end, said toggle arms being applied in contact with each other by means of one of the rolling zones thereof and being applied respectively against the two aforementioned surfaces by means of the second rolling zones, the radii of curvature of said rolling zones in the rolling plane being longer than the half-length of each aforementioned toggle arm, and a system for exerting lateral thrust on at least one of said toggle arms, each toggle arm being provided with means for producing displacement in rolling motion without sliding with respect to each other and with respect to the adjacent one of said flat surfaces.

2. A clamping system according to claim 1, wherein the means for obtaining rolling motion without sliding are constituted by a toothed sector disposed in parallel relation to the surface of each toggle arm which is in contact with the corresponding flat surface, said sector being adapted to cooperate with a toothed rack which is rigidly fixed to each flat surface.

3. Application of the system according to claim 2 to the construction of the device for locking the top plug of the shell of a nuclear reactor vessel, wherein the plug is applied against a conical seating formed in the top opening of the reactor vessel shell, wherein the shell has a vertical extension above the plug in the form of a projecting cylindrical portion in which is formed an annular recess provided at the top portion thereof with a conical surface which constitutes the first contact surface, wherein said plug is further provided on the top face and on the periphery thereof with a conical surface which is parallel to the first conical surface and constitutes the second contact surface, and wherein a plurality of clamping systems are spaced at uniform intervals around the periphery of said plug, said clamping systems being applied against said contact surfaces.

4. A system for clamping two components by separating two substantially parallel flat surfaces which are placed in oppositely facing relation and each of which forms part of one of said components, wherein said system comprises two compression struts or "toggle arms" provided with a rolling zone at each end, said toggle arms being applied in contact with other by means of one of the rolling zones thereof and being applied respectively against the two aforementioned surfaces by means of the second rolling zones, the radii of curvature of said rolling zones in the rolling plane being longer than the half-length of each aforementioned toggle arm, and a system for exerting lateral thrust on at least one of said toggle arms, each toggle arm being provided with means for producing displacement in rolling motion without sliding, the means for obtaining rolling motion without sliding being constituted by a toothed section disposed in parallel relation to the surface of each toggle arm which is in contact with the corresponding flat surface, said sector cooperating with a toothed rack rigidly fixed to each flat surface, said system locking the top plug of the shell of a nuclear reactor vessel, the plug being applied against a conical seating formed in the top opening of the reactor vessel shell, said shell having a vertical projecting cylindrical extension above the plug in which is formed an annular recess provided at the top portion thereof with a conical surface which constitutes the first contact surface, said plug being further provided on the top face and on the periphery thereof with a conical surface which is parallel to the first conical surface and constitutes the second contact surface, a plurality of clamping systems being spaced at uniform intervals around the periphery of said plug, said clamping systems being applied against said contact surfaces, the upper toggle arm of each clamping system being provided with a cam which runs along a support bracket rigidly fixed to the wall of the annular recess of the shell, the profile of said support bracket being such that the toothed sector of said toggle arm is continuously engaged with the toothed rack which is rigidly fixed to the first conical surface, the upper extremity of the lower toggle arm of each clamping system being applied against the lower extremity of the upper toggle arm by means of a jack in which the body of said jack is rigidly fixed to said plug and in which the extremity of the operating stem is applied against said lower toggle arm and by a restoring spring which is attached at one end to said plug and at the other end to said lower toggle arm.

5. An application according to claim 4, wherein the upper toggle arm of each clamping system is rigidly fixed to the operating stem of a jack in which the jack body is rigidly fixed to the bottom of the annular recess.

* * * * *